July 15, 1958     E. L. RABBEN     2,842,846

PHOTOGRAMMETRIC CALIPER

Filed July 12, 1955

INVENTOR.
ELLIS L. RABBEN
BY
ATTORNEY

United States Patent Office 2,842,846
Patented July 15, 1958

2,842,846

PHOTOGRAMMETRIC CALIPER

Ellis L. Rabben, Silver Spring, Md.

Application July 12, 1955, Serial No. 521,474

7 Claims. (Cl. 33—1)

This invention relates to caliper devices, and more particularly to an improved photogrammetric caliper suitable for measuring distances between selected points on aerial photographs, or the like.

A main object of the invention is to provide a novel and improved photogrammetric caliper which is simple in construction, which is easy to read, and which enables distances between points on aerial photographs, or on similar reduced informational material, to be accurately determined.

A further object of the invention is to provide an improved photogrammetric caliper which is inexpensive to manufacture, which is durable in construction, which is compact in size, which affords substantially complete visibility therethrough while being applicable directly to the flat surface on which it is to be employed, and which reduces parallax errors to a minimum.

Further objects and advantages of the invention will become apparent from the following description and claims, and from the accompanying drawings, wherein:

Figures 1, 2, 3, 4:
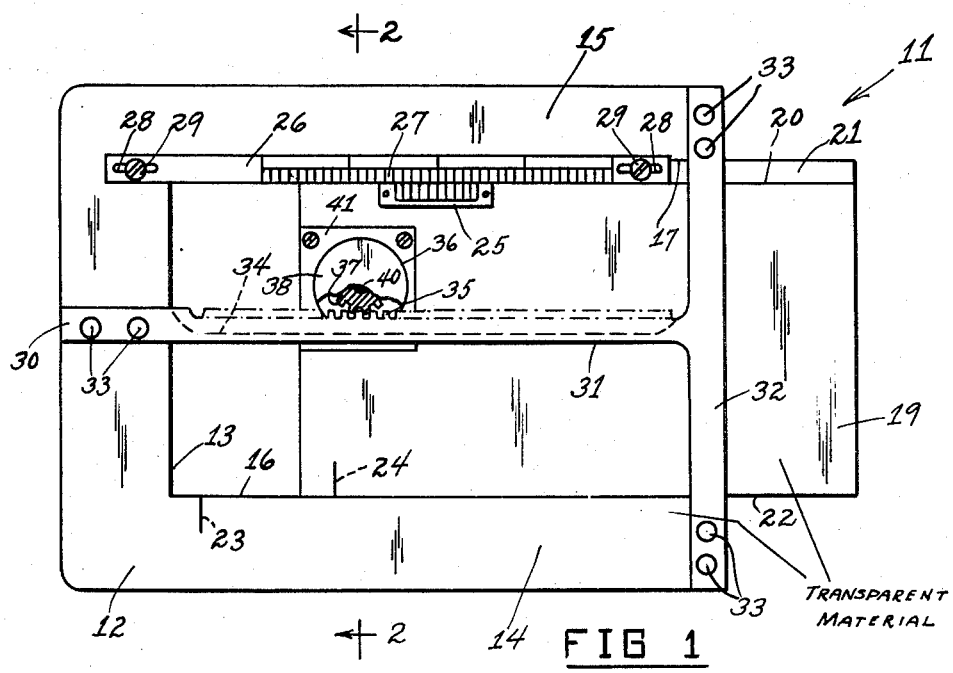
Figure 1 is a top plan view of an improved photogrammetric caliper device constructed in accordance with the present invention, a portion thereof being shown in horizontal cross-section.
Figure 2 is an enlarged transverse vertical cross-sectional view taken on line 2—2 of Figure 1.
Figure 3 is an enlarged end elevational view of the photogrammetric caliper device of Figure 1.
Figure 4 is a cross-sectional detail view taken on line 4—4 of Figure 2.

Referring to the drawings, the improved photogrammetric caliper device is designated generally at 11. Said device comprises a first flat transparent body 12 which may be of any suitable shape, for example, generally rectangular. The body 12 is formed with an open-ended, longitudinal slot 13, giving the body a generally U-shaped configuration, and defining respective parallel longitudinal side arms 14 and 15.

Side arm 14 has the straight longitudinal inside edge 16 which is accurately perpendicular to the plane of the body 12. Side arm 15 has the straight inside longitudinal edge 17 which is parallel to edge 16 and is formed with a longitudinal groove 18 of substantial depth.

Designated at 19 is a second flat transparent body of equal thickness with body 12 and which is shaped to slidably fit between the inside edges 16 and 17 of body 12 in coplanar relation to said body 12. At one longitudinal edge 20 thereof, body 19 is formed with a longitudinal rib or tongue 21 which is slidably received in groove 18. The other longitudinal edge 22 of body 19 is accurately perpendicular to the plane of the body 19 and makes face-to-face sliding contact with inside edge 16 of arm 14.

The bottom surface of arm 14 is inscribed with a line 23 adjacent to and accurately perpendicular to the inside edge 16 of said arm. The bottom surface of body 19 is inscribed with a similar line 24 adjacent to and accurately perpendicular to edge 22.

Secured on the longitudinal marginal portion of body 19 at the edge 20 thereof is a vernier scale 25, the end of which is employed as an index mark, said vernier scale 25 being disposed adjacent a longitudinal length scale plate 26 adjustably secured on the inside marginal portion of arm 15 adjacent the edge 17 thereof, as shown in Figure 1.

Scale plate 26 may comprise a flat bar inscribed with a length scale 27 thereon, cooperating with the vernier scale 25. Scale plate 26 is provided at its opposite ends with longitudinal slots 28, 28, through which extend clamping screws 29, 29, threadedly engaged in body 12, whereby the scale plate 26 may be locked in properly adjusted position with respect to the mark 23 on arm 14, for example, to make the zero mark on scale 27 correspond to the mark 23 on arm 14.

As shown in Figure 1, the scale plate 26 and vernier 25 are respectively secured on the upper surfaces of bodies 12 and 19, whereas the caliper marks 23 and 24 are respectively inscribed on the flat bottom surfaces of said bodies.

Designated at 30 is a generally T-shaped bar having the longitudinal stem portion 31 and the transversely extending head portion 32. As shown in Figure 1, the ends of the head portion 32 are secured by suitable fastening elements 33 to the ends of the respective arms 14 and 15. The end of the stem portion 31 is secured by similar fastening elements to the intermediate portion of the bight element of the U-shaped body 12.

Stem portion 31 is formed with the longitudinal recess 34 at one longitudinal edge thereof and is further formed with the rack teeth 35 extending along said edge. Designated at 36 is a gear wheel formed with gear teeth 37 meshingly engageable with the rack teeth 35, said gear wheel being formed with the top and bottom circular flanges 38 and 39 between which the toothed portion of the longitudinal edge of stem 31 is received.

Gear wheel 36 is secured on a shaft 40 which extends through a plate 41 secured in the top surface of body 19 flush therewith, as by fastening screws 42, shown in Figure 4. Secured to the bottom end of shaft 40 beneath plate 41 is a retaining disc 43, body 19 being formed with a transverse recess 44 in which disc 43 is movable. Plate 41 is formed with the transverse slot 45 through which shaft 40 extends, whereby the gear wheel 36 is transversely moveable relative to body 19, and may at times be unmeshed from the rack teeth 35.

Th upper circular flange 38 is preferably knurled at its periphery to facilitate manual rotation of the gear wheel.

In using the device, the scale plate 26 is first adjusted to its proper position on body 12, as by employing a suitable calibration plate disposed beneath the marks 23 and 24 and by setting the scale plate 26 so that vernier 25 gives a reading on scale 27 corresponding to the known spacing between the marks 23 and 24, as provided by the calibration plate. Scale plate 26 is then clamped in its adjusted position. To then measure the distance between two selected points on an aerial photograph, the device is placed on the photograph so that the straight line defined by the abutting straight edges 16 and 22 connects the points and the mark 23 is accurately located at one of the points. Gear wheel 36 is unmeshed from rack teeth 35 and is employed to move body 19 longitudinally relative to body 12, which is held stationary, until mark 24 is near the second point on the photograph. Gear wheel 36 is then moved into mesh with rack teeth 35 and is rotated until mark 24 is accurately located at the second point. The distance between the two points may then be accurately read from scale 27 by means of the vernier 25.

It will be noted that the bodies 12 and 19 are supported in coplanar relationship at all times by the interengagement of longitudinal tongue 21 with groove 18, cooperating with the interengagement of the toothed flange of stem 31 between the circular flanges 38 and 39. Flanges 38 and 39 are of sufficient radius so that the toothed flange of stem 31 is still retained between flanges 38 and 39 when the gear wheel 36 is moved transversely to the limit of its unmeshed position.

While a specific embodiment of a photogrammetric caliper device has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A photogrammetric caliper comprising a first flat transparent body having a plurality of straight parallel edge portions, a second flat transparent body of substantially the same thickness as said first body arranged coplanar with said first body and slidably interengaged with said first body along said edge portions, respective marks on slidably interengaged adjacent edge portions of the first and second flat transparent bodies, the bottom surfaces of said first and second transparent bodies being substantially flush with each other along the slidably interengaged parts of said last-named edge portions, whereby said bottom surfaces may be disposed directly on a plane surface to be examined, a length scale on one of the adjacent remaining edge portions of the bodies, and index means on the other of said remaining adjacent edge portions.

2. A photogrammetric caliper comprising a first flat transparent body having a plurality of straight parallel longitudinal edge portions, a second flat transparent body of substantially the same thickness as said first body slidably interengaged with said first body along said longitudinal edge portions, respective transverse marks on slidably interengaged adjacent longitudinal edge portions of the first and second flat transparent bodies, the bottom surfaces of said first and second transparent bodies being substantially flush with each other along the slidably interengaged parts of said last-named edge portions, whereby said bottom surfaces may be disposed directly on a plane surface to be examined, a length scale on one of the remaining adjacent longitudinal edge portions of the bodies, index means on the other of said remaining adjacent longitudinal edge portions, and interengaging means on the bodies slidably supporting said bodies in coplanar relationship.

3. A photogrammetric caliper comprising a first flat transparent body formed with an open-ended slot having straight parallel longitudinal edges, whereby said first flat body is substantially U-shaped, a second flat transparent body of substantially the same thickness as said first body arranged coplanar with said first body and slidably disposed in said slot, respective transverse marks on slidably interengaged adjacent longitudinal edges of the first and second flat transparent bodies, the bottom surfaces of said first and second transparent bodies being substantially flush with each other along the slidably interengaged parts of said last-named longitudinal edges, whereby said bottom surfaces may be disposed directly on a plane surface to be examined, a length scale on one of the remaining adjacent longitudinal edges of the flat transparent bodies, and index means on the other of said remaining adjacent longitudinal edges.

4. A photogrammetric caliper comprising a first flat transparent body formed with an open-ended slot having straight parallel longitudinal edges, whereby said first flat body is substantially U-shaped, a second flat transparent body of substantially the same thickness as said first body slidably disposed in said slot, interengaging means on the bodies slidably supporting said second flat transparent body in coplanar relationship with respect to the first flat transparent body, respective transverse marks on adjacent longitudinal edges of the first and second flat transparent bodies, the bottom surfaces of said first and second transparent bodies being substantially flush with each other along the slidably interengaged parts of said last-named longitudinal edges, whereby said bottom surfaces may be disposed directly on a plane surface to be examined, a length scale on one of the remaining adjacent longitudinal edges of the flat transparent bodies, and index means on the other of said remaining adjacent longitudinal edges.

5. A photogrammetric caliper comprising a first flat transparent body formed with an open-ended slot having straight parallel longitudinal edges, whereby said first flat body is substantially U-shaped, a second flat transparent body of substantially the same thickness as said first body slidably disposed in said slot, interengaging means on the bodies slidably supporting said second flat transparent body in coplanar relationship with respect to the first flat transparent body, respective transverse marks on adjacent longitudinal edges of the first and second flat transparent bodies, the bottom surfaces of said first and second transparent bodies being substantially flush with each other along the slidably interengaged parts of said last-named longitudinal edges, whereby said bottom surfaces may be disposed directly on a plane surface to be examined, a length scale on one of the remaining adjacent longitudinal edges of the flat transparent bodies, and index means on the other of said remaining adjacent longitudinal edges, said index means comprising a verneir located adjacent said length scale.

6. A photogrammetric caliper comprising a first flat transparent body formed with an open-ended slot having straight parallel longitudinal edges, whereby said first flat body is substantially U-shaped, a second flat transparent body of substantially the same thickness as said first body arranged coplanar with said first body and slidably disposed in said slot, respective transverse marks on adjacent longitudinal edges of the first and second flat transparent bodies, a length scale on one of the remaining adjacent longitudinal edges of the flat transparent bodies, index means on the other of said remaining adjacent longitudinal edges, a longitudinal rack bar rigidly secured on said first flat transparent body parallel to the longitudinal edges of said slot, and a rack wheel journalled to said second body and being meshingly engageable with said longitudinal rack bar.

7. A photogrammetric caliper comprising a first flat transparent body formed with an open-ended slot having straight parallel longitudinal edges, a second flat transparent body slidably disposed in said slot, interengaging means on the bodies retaining the bodies in coplanar relationship, respective transverse marks on adjacent longitudinal edges fo the first and second flat transparent bodies, a length scale on one of the remaining adjacent longitudinal edges of the flat transparent bodies, index means on the other of said remaining adjacent longitudinal edges, a longitudinal rack bar rigidly secured on said first flat transparent body parallel to the longitudinal edges of the slot, a rack wheel adjacent said rack bar, and means on the second body supporting said rack wheel for rotary movement and for transverse sliding movement toward and away from said rack bar, said rack wheel being formed and arranged to meshingly engage with said rack bar.

References Cited in the file of this patent

UNITED STATES PATENTS

| | | |
|---|---|---|
| 1,271,907 | Jury | July 9, 1918 |
| 2,424,713 | Seidman | July 29, 1947 |
| 2,471,099 | Dethlefs et al. | May 24, 1949 |
| 2,577,159 | Seferow | Dec. 4, 1951 |
| 2,501,550 | Tamagna et al. | Mar. 21, 1950 |
| 2,624,951 | Morris | Jan. 13, 1953 |